United States Patent Office 3,420,914
Patented Jan. 7, 1969

3,420,914
UNSATURATED POLYESTER COMPOSITIONS
AND THEIR PREPARATION
Clayton A. May, Orinda, Calif., assignor to Shell Oil
Company, New York, N.Y., a corporation of Delaware
No Drawing. Filed Nov. 13, 1964, Ser. No. 411,138
U.S. Cl. 260—837  4 Claims
Int. Cl. C08g 30/10; C08g 30/04

ABSTRACT OF THE DISCLOSURE

New curable polyester compositions having controlled viscosity are disclosed. These compositions comprise a mixture of a soluble curable unsaturated polyester of a polyepoxide and an ethylenically unsaturated organic carboxylic acid, and a dissimilar polymeric material possessing a plurality of groups, such as epoxy, ester hydroxyl, and acetal groups. Examples of the polyesters and the polymeric additives are given. Also disclosed are the above-noted compositions containing ethylenically unsaturated monomer, such as styrene. Uses of the compositions, such as in the preparation of laminates, are also disclosed.

---

This invention relates to new compositions of matter and to their preparation. More particularly, the invention relates to new curable compositions containing certain unsaturated polyesters and special polymeric additives, to their preparation and to the use of the compositions, particularly in the formation of castings and laminated products.

Specifically, the invention provides new and particularly useful curable compositions of controlled viscosity comprising a mixture of (1) a soluble curable unsaturated polyester of a polyepoxide possessing more than one vic-epoxy group and preferably a glycidyl polyether, and an ethylenically unsaturated organic carboxylic acid, such as, for example, methacrylic acid, and (2) a dissimilar polymeric material possessing a plurality of groups selected from the group consisting of epoxy, ester, hydroxyl and acetal groups, such as, for example, an addition polymer of vinyl acetate.

As a special embodiment, the invention provides a special class of curable compositions which have varying viscosities and are particularly adapted for use in the preparation of laminated products. These special compositions comprising a mixture of (1) an unsaturated polyester having the formula

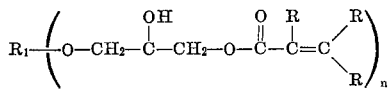

wherein $R_1$ is an aromatic radical, R is hydrogen or alkyl, and $n$ is an integer of at least 2, and preferably 2 to 6, and (2) a controlled amount of a polymeric additive comprising a polymer possessing a plurality of ester groups, epoxy, hydroxyl or acetal groups and preferably an addition polymer of vinyl acetate.

The invention further provides new and valuable laminated products prepared from the above-described curable compositions.

Cured polyepoxides have many desired properties, such as solvent and chemical resistance and good adhesion to metal and there has been a desire to transfer many of these properties over to the conventional polyester type products. I have found that this can be accomplished by reaction of the polyepoxides with an unsaturated monocarboxylic acid, such as, for example, methacrylic acid. The products prepared in this manner can be cured in the presence of peroxide catalysts to form products having the desired characteristics of the polyepoxides as well as those of the unsaturated polyesters.

The use of these products for certain applications, however, is rather limited because of the low viscosity of the products. It would be desirable, for example, for using these products in applications, such as in matched metal die molding, to have a material of greater viscosity.

It is, therefore, an object of the invention to provide new compositions containing unsaturated polyesters. It is a further object to provide new compositions containing polyesters prepared from polyepoxides which have increased viscosity. It is a further object to provide new compositions containing unsaturated polyesters which have increased viscosity but are stable at room temperature and can be cured at elevated temperatures to form superior laminated products. It is a further object to provide new compositions containing unsaturated polyesters which can be prepared with a variety of viscosities. It is a further object to provide new and valuable laminated products prepared from the aforementioned compositions. These and other objects of the invention will be apparent from the following detailed description thereof.

It has now been discovered that these and other objects may now be accomplished by the new compositions of the invention comprising curable compositions of controlled viscosity comprising a mixture of (1) a soluble unsaturated polyester of a polyepoxide possessing more than one vic-epoxy group and preferably a glycidyl polyether, and an ethylenically unsaturated organic carboxylic acid, such as methacrylic acid, and (2) a dissimilar polymeric material possessing a plurality of groups selected from a group consisting of ester groups, epoxy groups, hydroxyl groups and acetal groups. Surprisingly, it has been found that these new compositions can be prepared with a variety of viscosities by controlling the amount of the additive polymer added to the reaction mixture. By thus controlling the proportions one is able to obtain products having a wide range of viscosities which can be used for a great variety of different applications. It has also been found that the presence of the additives imparts unexpected improvement in the properties of the cured product, such as improved hardness and distensibility.

That the above-noted polymer additives could be used to impart the above properties was quite surprising in view of the fact that conventional unsaturated polyesters are always combined with unsaturated monomers and would be expected to be incompatible with high molecular weight polymeric materials.

The unsaturated polyesters used in making the new compositions of the invention are those obtained by reacting polyepoxides having more than one vic-epoxy group with ethylenically unsaturated organic acids.

The polyepoxides used in the process of the invention comprise those compounds possessing more than one vic-epoxy group, i.e., more than one

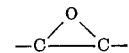

group. These polyepoxides may be saturated or unsaturated, aliphatic, cycloaliphatic, aromatic or heterocyclic and may be substituted if desired with non-interfering substituents, such as halogen atoms, hydroxyl groups, ether, radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

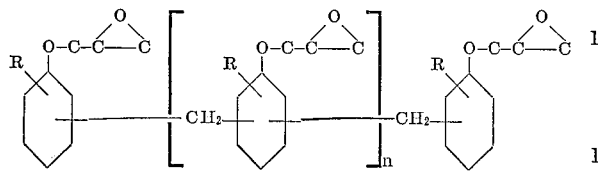

wherein R is hydrogen or an alkyl radical and $n$ is an integer of 1 to about 10. Preparation of these polyepoxides is illustrated in U.S. 2,216,099 and 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecanedienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl adipate, diglycidyl isophthalate, di(2,3-epoxybutyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3 - epoxyoctyl)tetrahydrophthalate, di(4,5-epoxydodecyl)maleate, di(2,3-epoxybutyl)terephthalate, di(2,3-epoxypentyl)thiodipropionate, di(5,6 - epoxytetradecyl)diphthyldicarboxylate, di(3,4-epoxyheptyl)sulfonyldibutyrate, tri(2,3-epoxybutyl)1,2,4-butanetricarboxylate, di(5,6 - epoxypentadecyl)tartarate, di(4,5-epoxytetradecyl)tartarate, di(4,5-epoxytetradecyl) maleate, di(2,3-epoxybutyl)azelate, di(3,4-epoxybutyl) citrate, di(5,6-epoxyoctyl)cyclohexane-1,3 - dicarboxylate, di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxy-3,4-epoxyhexyl, 3,4-epoxypentanoate; 3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate; 13-diepoxyeicosanedioate; dihexyl 6,7,10,11-diepoxyhexadecanedioate; didecyl-9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting the diethylene glycol, with 2-cyclohexene-1,4-dicarboxylic acid and the like, and mixtures thereof.

Still another group comprises the epoxidized polyethylenically unsaturated hydrocarbons, such as, epoxidized 2,2-bis(2-cyclohexenyl)propane, epoxidized vinyl cyclohexene and epoxidized dimer of cyclopentadiene.

The other component in the reaction comprises an ethylenically unsaturated organic carboxylic acid which may be aliphatic, cycloaliphatic or aromatic, and may be monocarboxylic or polycarboxylic. Examples of the acids to be utilized include acrylic acid, methacrylic acid, cyclohexene carboxylic acid, maleic acid, crotonic acid, alpha-phenylacrylic acid, tetrahydrophthalic acid, 2,4-octadienedicarboxylic acid, dodecadienoic acid and the like.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen, tetrahydrophthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting prepolymers, are the ethylenically unsaturated monocarboxylic acids and unsaturated partial containing 3 to 10 carbon atoms, and the alkenyl and alkyl esters of alkenedioic acids containing up to 12 carbon atoms.

The unsaturated polyesters are preferably prepared by reacting the above components in the presence of a catalyst, such as a tertiary amine, phosphine or onium compound.

The preferred catalyst to be utilized in the process comprises the onium salts, and preferably those containing phosphorous, sulfur or nitrogen, such as, for example, the phosphonium, sulfonium and ammonium salts of inorganic acids. Examples of these include, among others, benzyltrimethylammonium sulfate, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium thiocyanate, triphenylsulfonium chloride, dicyclohexyldiamylphosphonium iodide, benzyltrimethylammonium thiocyanate, and the like, and mixtures thereof.

Preferred onium salts to be employed include those of the formulae

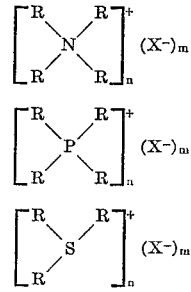

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, $m$ is the valency of the X ion and $n=m$.

The amount of the above-noted polyepoxide and acid to be used in the reaction may vary over a wide range. In general, these reactants are used in approximately chemically equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of epoxide per equivalent of carboxylic acid.

The amount of the catalyst employed may also vary over a considerable range. In general, the amount of the catalyst will vary from about .05% to about 3% by weight, and more preferably from .1% to 2% by weight of the reactants.

The reaction may be conducted in the presence or absence of solvents or diluents. In most cases, the reactants will be liquid and the reaction may be easily effected without the addition of solvents or diluents. However, in some cases whether either or both reactants are solids or viscous liquids it may be desirable to add diluents to assist in effecting the reaction. Examples of such materials include the inert liquids, such as ketones, xylene, toluene, cyclohexane and the like.

If solvents are employed in the reaction and the resulting product is to be used for coating purpose, the solvent may be retained in the reaction mixture. Otherwise, the solvent can be removed by any suitable method as by distillation and the like. If the product is not to be used for some time after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric presure, but it may be advantageous in some cases to employ subatmospheric or superatmospheric pressures.

The course of the reaction may be conveniently followed by determination of the acidity. The reaction is considered to be substantially complete when the acidity has been reduced to about .020 eq./100 g. or below.

The preparation may be effected in any suitable manner. The preferred method merely comprises adding the polyepoxide, acid, catalyst, and solvent or diluent, if desired, in any order and then applying the necessary heat to bring about the reaction. The reaction mixture may then be distilled or stripped to remove any of the necessary components, such as solvents, catalyst, excess reactants and the like.

The polyester products obtained by the above process will vary from liquids to solid resins. The products will possess a plurality of free OH groups, and in the case of the unsaturated acids, possess a plurality of ethylenic groups, and will be reactive through these groups. The products will be of higher molecular weight than the basic polyepoxide from which they are formed and will possess at least two acid groups per polyepoxide unit.

The polyesters will also possess a linear structure, i.e., free of cross-linking. As a result they will be soluble in acetone and other conventional solvents. They will be relatively non-heat reactive, i.e., difficult to body by heating alone. However, constant application of heat may cause them to suddenly gel.

The new compositions of the invention are prepared by mixing the above-described unsaturated polyesters with polymeric additives comprise those containing a plurality of ester, i.e.,

groups, a plurality of epoxy groups, i.e.,

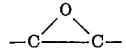

groups, a plurality of alcoholic hydroxyl groups,

groups, or a plurality of acetal groups, i.e.,

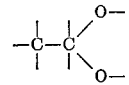

groups.

Examples of these materials containing ester groups include the addition polymers of ethylenically unsaturated monomers, such as the acrylate esters, vinyl and allyl esters and the like. Preferred materials to be used include the acrylate polymers, such as polymers of alkyl acrylates or methacrylates, such as methyl acrylate, ethyl acrylate, butyl acrylate, methyl methacrylate, butyl methacrylate, cyclohexyl methacrylate and the like. These monomers may be polymerized alone or in combination with other unsaturated monomers, such as styrene, alpha-methylstyrene, butadiene, isoprene, chloroprene, cyclopentadiene, ethylene, butylene, vinyl chloride, acrylonitrile, dimethyl maleate, ethylene glycol diacrylate, acrylamide, methacrylamide, N-ethyl acrylamide and the like, and mixtures thereof. Especially preferred acrylate polymers to be employed include the homopolymers and copolymers of the alkyl acrylates or methacrylates with dissimilar monomers containing a

group wherein the dissimilar monomer makes up no more than 75% by weight of the combined mixture.

Also preferred are the vinyl ester polymers, and particularly the vinyl esters of monocarboxylic acids containing 1 to 20 carbon atoms. Examples of these include the polymers of vinyl acetate, vinyl butyrate, vinyl adipate, vinyl octoate, ethyl vinyl adipate, vinyl pivalate, vinyl succinate and the like.

Another preferred group comprises the polyvinyl acetals. These polymeric products are the acetals obtained by the reactions of an aldehyde with polyvinyl alcohol, which alcohol is normally derived from polyvinyl acetate. Examples of such polymers include the polyvinyl formals, polyvinyl butyrals, polyvinyl acrylals, and the like, and mixtures thereof. Many of the polyvinyl acetal resins are commercially available. Thus, a resin solid under the name of Formvar 15/95E (Shawninigan Resin Corp.) is a product derived from polyvinyl acetate and is made by replacing 95% of the acetal groups by formal groups from formaldehyde, the original polyvinyl acetate being a substance which gives a benzene solution of 86 grams per liter having a viscosity of 15 centipoises at 20° C.

Any polyvinyl acetal can be used although it is preferred that the material be a polyvinyl acetal resin of an alkanol of 1 to 4 carbon atoms. It is also preferred that the resin be derived from polyvinyl acetate with from 50% to 100% of the acetyl groups replaced with alkanol groups of 1 to 4 carbon atoms, which polyvinyl acetal resins has a molecular weight of at least 15,000 and preferably 25,000 to 150,000.

Also preferred are the polyepoxides. This includes those having a plurality of

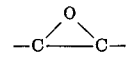

Such compounds may be any of those described above for preparation of the unsaturated ester.

Another preferred group of polymers are the polymers containing a plurality of alcoholic OH groups. Examples of these include the polymers obtained by polymerizing esters, such as vinyl acetate and then hydrolyzing off the ester group, polymers obtained by unsaturated alcohols or by polymerizing epoxy compounds. Other examples include polyhydroxy-containing polymers obtained by reacting polyepoxides with polyhydric phenols such as described and claimed in copending patent application Serial No. 145,486, filed Oct. 16, 1961, or products obtained by reacting epichlorohydrin with polyhydric phenols such as described in Carpenter et al. U.S. 2,602,075. Other examples include the hydroxy-containing alkyd resins, hydrated polyepoxides and the like.

The polymeric additives preferably have a molecular weight between 2,000 and 1,000,000 as determined by the light scattering technique.

The compositions of the invention are prepared by mixing the unsaturated polyester as described above preferably with an unsaturated monomer as described hereinafter and then adding to this mixture the desired polymer additive. The amount of the polymer added will vary depending upon the desired viscosity to be obtained. Preferably, the amount of the polymer will vary from about .1 part to about 40 parts per 100 parts of unsaturated polyester or its solution in one of the aforementioned. More preferably, the amount of the polymer and polyester will vary in a weight ratio of 1:100 to 15:100.

The mixing can be accomplished over a wide range of temperatures. In most cases, the mixing would take place at room temperature and it is preferably conducted at or near room temperature. The mixing however can be accomplished advantageously at temperature ranges from 25° C. to 75° C., particularly if the polymer additive is solid or a thick liquid.

The mixing can be accomplished in the presence of solvents or diluents. In some cases, it is preferred to employ monomers and preferably those containing an ethylenic

group generally used with unsaturated polyesters such as, for example, styrene, methyl methacrylate, butadiene, acrylonitrile, methacrylonitrile, diallyl phthalate, allyl propionate, isoprene, diallylmaleate, divinyl adipate, dichlorostyrene, ethylene glycol diacrylate, alpha-methylstyrene, vinyl naphthalene, vinyl phenol, divinyl benzene, vinyl benzoate, triallyl cyanurate, vinyl chloride, vinylidene chloride, propylene, isobutylene, methyl pentadiene, vinyl pyrrolidone, vinylpyridine, diethyl maleate, and the like. These are preferably used in amounts varying from about 1% to 70% by weight.

The compositions obtained by the above-described process will be soluble in solvents such as benzene, acetone and the like and will possess ethylenically unsaturated bonds and can be cured in the presence of peroxides to form insoluble infusible products.

The compositions formed by the above process can be cured by heating with peroxide catalysts (e.g., 1% to 10% by weight) to form valuable products. They may be utilized, for example, to form various types of coating and impregnating compositions or in making cast or molded plastic articles. The compositions are particularly suited for use in making laminated products as they have ability to adhere to the substrate and to be cured under conventional limited conditions to form hard heat resistant products having good chemical resistance.

In making the laminates one may apply as by dipping, painting, spraying or padding the desired prepolymer composition or solution onto the substrate, removing any excess material and then subjecting the resulting product to the desired pressure and temperature to effect a cure. The material treated in this manner may be regular sheets of cloth, paper, or wood and the like, or may be strands or fibers which may be alternately woven or wound into the desired composite structure. The new compositions are particularly suited for use in the filament winding technique in that they can be easily applied to the glass strands and treated material wound on the mandrel to form the desired laminated product. The products are then subjected to conventional pressures and temperatures for curing, e.g., 20° C. to 300° C. and pressure 15 p.s.i. to 2000 p.s.i.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified, parts described in the examples are parts by weight.

EXAMPLE I

This example illustrates the preparation of a composition using an unsaturated polyester obtained by reacting diglycidyl ether of 2,2-bis(4-hydroxyphenyl)propane hereinafter referred to as Polyether A and methacrylic acid, and polymethyl methacrylate.

The unsaturated polyester was prepared as follows:
68.8 parts of Polyether A were combined with 31.2 parts of glacial methacrylic acid and 0.43 part of tetramethyl ammonium chloride and the mixture heated at 115° C. for 1 hour and 15 minutes. During that time, the acidity changed from 0.362 eq./100 g. to about 0.017 eq./100 g. indicating there was substantially complete reaction. The resulting product was an acetone soluble viscous liquid polyester identified as having the following structure:

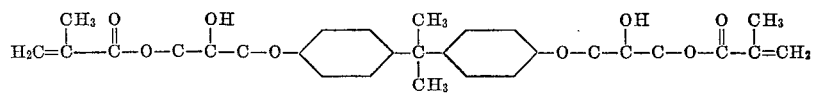

The yield was 100%. This polyester was combined with styrene to form a 50% styrene solution. Such a solution had a viscosity of 16.5 cps.

100 parts of the polyester styrene solution prepared above was combined with 1 part of polymethyl methacrylate having a mol weight of 100,000 or greater and the mixture stirred. Viscosity of the resulting solution was 23 cps. 1 part more of the polymer was added and the mixture stirred. The viscosity had increased to 30 cps. An additional 3 parts of the polymer was added and the viscosity increased to 62 cps.

The compositions prepared above were combined with .5% to 1% ditertiary butyl peroxide and heated at 115° C. The resulting cured products were hard and tough and had good resistance to chemicals, solvents and water.

The compositions are also useful in the preparation of glass fiber laminated products.

EXAMPLE II

A 50% solution of the unsaturated polyester of Example I was prepared in styrene. To this polyester was added varying amounts of a solid glycidyl ether of 2,2-bis(4-hydroxyphenyl)propane having an epoxy value of 0.03 eq./100 g. and mol weight of 3750.

1 part of the polyglycidyl ether was added to 100 parts of the unsaturated polyester and the mixture stirred. The viscosity changed from 16.5 cps. to 23 cps. 1 additional part of the glycidyl ether was added and the mixture stirred. The viscosity in this case was 27 cps. 3 more additional parts of the glycidyl ether were added and the mixture stirred. The viscosity of the resulting mixture was 43.

The compositions prepared above were combined with .5% and 1% benzoyl peroxide and heated at 115° C. The resulting cured products were hard and tough and had good resistance to chemicals, solvents and water.

The above compositions are also useful in the preparation of glass fiber laminated products.

EXAMPLE III

A 50% solution of the unsaturated polyester of Example I was prepared in styrene. To this polyester was added varying amounts of a high molecular weight thermoplastic polymer obtained by reacting epichlorohydrin with bis-phenol. To 100 part portion was added 1 part of the thermoplastic polymer and the mixture stirred. The viscosity changed from 16.5 cps. to 27 cps. 1 additional part of the thermoplastic polymer was added and the mixture stirred. The viscosity in this case was 38 cps. 3 more additional parts of the thermoplastic polymer was added and the mixture stirred. The viscosity of the resulting mixture was 108 cps.

The compositions prepared above were combined with .5% and 1% methyl ethyl ketone peroxide and heated at 115° C. The resulting cured products were hard and tough and had good resistance to chemicals and solvents.

The above compositions are also useful in the preparation of glass cloth laminated products.

EXAMPLE IV

To a 50% solution of the unsaturated polyester of Example I in styrene was added varying amounts of polyvinyl formal having a molecular weight of 50,000. To 100 parts of the 50% solution was added 1 part of the polyvinyl formal and the mixture stirred. The viscosity changed from 16.5 cps. to 51 cps. 1 additional part of the polyvinyl formal was added to the mixture and the components stirred. The viscosity in this case was 114. The addition of 3 additional parts of the polyvinyl formal changed the viscosity to 1085 cps.

The compositions prepared above are combined with 1% benzoyl peroxide and the mixture heated at 115° C. The resulting cured products are hard and tough and have good resistance to chemicals and solvents.

EXAMPLE V

To 100 parts of a 50% solution of the unsaturated polyester of Example I in styrene was added 5 parts of a copolymer of butadiene and methyl methacrylate copolymer, and the mixture stirred. This mixture had a viscosity of 108 as compared to 16.5 cps. for the control.

The composition prepared above is combined with 1% benzoyl peroxide and the mixture heated at 115° C. The resulting cured products are hard and tough and have good resistance to chemicals and solvents.

EXAMPLE VI

To 100 parts of a 50% solution of the unsaturated polyester of Example I in styrene was added 5 parts of polyvinyl acetate, and the mixture stirred. This mixture had a viscosity of 590 as compared to 16.5 cps. for the control.

The composition prepared above is combined with 1% ditertiary butyl peroxide and heated at 115° C. The resulting cured products were hard and tough and had good resistance to chemicals and solvents.

The above composition is also useful in the preparation of glass cloth laminated products.

EXAMPLE VII

Examples I to VI are repeated with the exception that the unsaturated polyester utilized was one prepared by reacting the glycidyl ether with acrylic acid. Related results are obtained.

EXAMPLE VIII

An unsaturated polyester is prepared by reacting diglycidyl resorcinol with methacrylic acid by the method shown in Example I. The resulting product

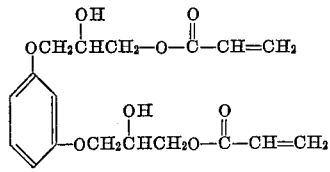

is combined with 50 parts of styrene to form a 50% styrene solution. To 100 parts of this solution was added 1 part of polymethyl methacrylate and the mixture stirred. The viscosity had increased about 8–10 centipoises. Addition of a further amount of the polymer caused further increase in viscosity. The resulting solution was then combined with .5% ditertiary butyl peroxide and the mixture heated at 115° C. The resulting cured product was hard and tough and had good resistance to chemicals, solvents and water.

EXAMPLE IX

Example I is repeated with the exception that the styrene is replaced with each of the following: vinyl toluene, vinyl acetate, N-vinyl pyrrolidone, allylidene diacetate, triallyl cyanurate, diethyl maleate, diethyl fumarate, fumaronitrile, butyl methacrylate, methyl methacrylate, alpha-methyl styrene, divinyl benzene, acrylamide, vinyl 2-chloroethyl ether, acrylonitrile, and divinyl succinate. Related results are obtained.

EXAMPLE X

Examples I and II are repeated with the exception that the ratio of unsaturated ester to styrene is changed as follows: 90:5, 85:15, 60:40 and 25:75. Related results are obtained in each case.

EXAMPLE XI

Example III is repeated with the exception that the epichlorohydrin polyhydric phenol resin is replaced with a polyhydric resin obtained by reacting a diglycidyl ether of bis-phenol A. With bis-phenol A it is according to Example I of copending application Serial No. 145,486, filed Oct. 16, 1961. This resin had a softening point of 145–185° C. and an intrinsic viscosity of 0.35 to 0.45 dl./g. Related results are obtained.

I claim as my invention:

1. A composition comprising the mixture of (1) an unsaturated polyester of the formula

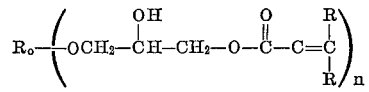

wherein $R_o$ is an aromatic radical, R is a member of the group consisting of hydrogen and alkyl radicals, and $n$ is an integer of 2 to 4, and (2) from .1 to 40 parts per 100 parts of the unsaturated polyester of a vinyl ester polymer.

2. A composition as in claim 1 wherein the vinyl ester polymer is a polymer of vinyl acetate.

3. A composition as in claim 1 wherein the polymer additive is a copolymer of vinyl acetate and an acrylate ester.

4. A composition as in claim 1 wherein the polymer additive is a copolymer of vinyl chloride and vinyl acetate.

References Cited

UNITED STATES PATENTS

| | | | |
|---|---|---|---|
| 2,824,851 | 2/1958 | Hall | 260—837 |
| 2,826,562 | 3/1958 | Shokal | 260—837 |
| 2,846,410 | 8/1958 | Armitage | 260—837 |
| 3,002,959 | 10/1961 | Hicks | 260—88.1 |
| 3,156,740 | 11/1964 | Bussell | 260—836 |
| 3,301,743 | 1/1967 | Fekete et al. | 260—837 |

MURRAY TILLMAN, Primary Examiner.

J. C. BLEUTGE, Assistant Examiner.

U.S. Cl. X.R.

260—18, 23, 47, 32.8, 33.6, 78.4, 78.5, 901, 830, 836, 885; 156—172, 330; 161—184, 185